United States Patent [19]

Harris

[11] Patent Number: 5,486,945
[45] Date of Patent: Jan. 23, 1996

[54] OPTICS FOR PASSIVE FACET TRACKING

[75] Inventor: Ellis D. Harris, Claremont, Calif.

[73] Assignee: Xerox Corporation, Stamford, Conn.

[21] Appl. No.: 360,480

[22] Filed: Dec. 21, 1994

[51] Int. Cl.⁶ .................................................. G02B 26/08
[52] U.S. Cl. ........................ 359/216; 359/203; 359/217;
359/218; 347/259; 347/261
[58] Field of Search .................................... 359/201–203,
359/205–208, 216–219; 347/258–261; 348/203,
205; 250/234–236; 358/296, 474

[56] References Cited

U.S. PATENT DOCUMENTS 3,973,826  8/1976  Lobb ......................................... 359/217
5,343,326  8/1994  Ossman et al. ........................... 359/216

*Primary Examiner*—James Phan
*Attorney, Agent, or Firm*—Nola Mae McBain

[57] ABSTRACT

A passive facet tracking system using passive optical components to induce a beam of light to track a facet of a rotating mirror polygon. The properties of the passive components are such that they collimate a light beam in a tangential plane in a complete trip through the passive optical components and the passive optical components focus the beam in the sagittal plane so that the beam is collimated in the tangential plane and focussed in the sagittal plane when it arrives at the center of the facet.

8 Claims, 6 Drawing Sheets

5,486,945

OPTICS FOR PASSIVE FACET TRACKING

BACKGROUND

This invention relates to scanning devices employing a rotatable mirror device such as those used in laser printing devices and specifically to facet tracking devices. FIG. 1 shows a typical laser printing device utilizing a rotating mirror for scanning. A laser 10 emits a beam 12 towards pre-polygon optics 14. After passing through the pre-polygon optics 14, the beam 12 falls on a scanner 16. The scanner 16 is a rotating polygon with flat reflecting facets 18. As the scanner 16 rotates, the beam 12 is scanned along a scan line on a photoreceptor 22. The direction along the scan line 20 is the tangential plane and the direction perpendicular to the scan line on the photoreceptor 22 is the sagittal plane.

Scanner performance is determined by the physical limitations on the speed at which the mirror is rotated, by the angular deflection of the laser beam achieved by reflection from a facet from the rotating polygon, the size of the facets, and the width of the beam being scanned where it is incident on the rotating mirror.

The beam width impacts the scanning speed because it determines the minimum facet size of a facet on the rotating mirror. A larger facet means a larger rotating polygon and hence larger, more costly motor polygon assemblies with higher power motors and/or slower scanning speeds. Scanning speeds, for a given beam width, can be increased by the use of facet tracking devices because they allow a smaller facet to be used and therefore smaller rotating mirrors which can be rotated faster.

Facet tracking devices are known and have been described as in U.S. Pat. No. 3,973,826 by Lobb which describes a device for passive facet tracking and angle doubling. Lobb describes a system utilizing a prescanner which, as it rotates with the scanner, produces a variable deflection in the scanned beam so that during a scan period, the beam moves at the speed of a scanner and in the same direction. The prescanner, by slightly deflecting the beam at the speed of the scanner and in the same direction, maintains the position of the beam centered in the scanning facet. Specifically, a beam which is focused on a prescanner is reflected off the prescanner to a concave mirror which causes the beam to converge but not focus on a facet of the scanner. The prescanner is built using cylindrical or curved facets and the scanner is built using flat facets.

In the Lobb patent, the beam is not collimated at the scanner facet in the scanning plane, thus any variation in radius between the facets will translate into scanning errors on the scanning plane. In a laser printing application, these scanning errors show up as pixel placement errors visible on a printed page. When the scanned beam is collimated in the scanned plane at the scanner facet, polygon manufacturing tolerances can be relaxed with resultant cost savings.

In the Lobb patent, the beam is not focused on the scanner facet in the sagittal plane. As a consequence, pyramidal errors in the scanner facet and bearing wobble will result in variable spacing between scan lines. In a laser printing application, these errors show up on the printed page as differences in spacing between the printed lines. Even very small differences are apparent, producing unacceptable output quality. When the beam is focused on the scanner facet in the sagittal plane, pyramidal errors may be optically removed by focussing the facet as well as the beam from the facet onto the scan line. Again, this allows polygon manufacturing tolerances to be relaxed with resultant cost savings and no loss in print quality.

The present invention uses anamorphic optics to collimate the beam in the tangential plane at the scanning facet and to focus the beam in the sagittal plane at the scanning facet so that errors produced by radial and pyramidal variations of the scanning facets may be substantially reduced or easily corrected to provide for improved scanning.

Further advantages of the invention will become apparent as the following description proceeds.

SUMMARY OF THE INVENTION

Briefly stated, and in accordance with the present invention, there is provided: a passive facet tracking system using passive optical components to induce a beam of light to track a facet of a rotating mirror polygon. As it impacts the flat facet, the beam of light will have been:

a) collimated in the tangential plane to minimize the effects of facet to facet radius variations on the printed output, b) focussed in the sagittal plane to allow for optical reduction of polygon pyramidal errors and bearing wobble which causes line to line spacing variations on the printed output if left uncompensated, and c) conditioned to reside in a plane normal to the polygon axis of rotation to prevent scan line bow.

Scan line bow prevention is particularly important in a multiple beam system where differential bow between the beams produces poor quality printed output. Although, the system will be described with reference to a single beam system, it can be used with multiple beam systems.

While the present invention will be described in connection with a preferred embodiment and method of use, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
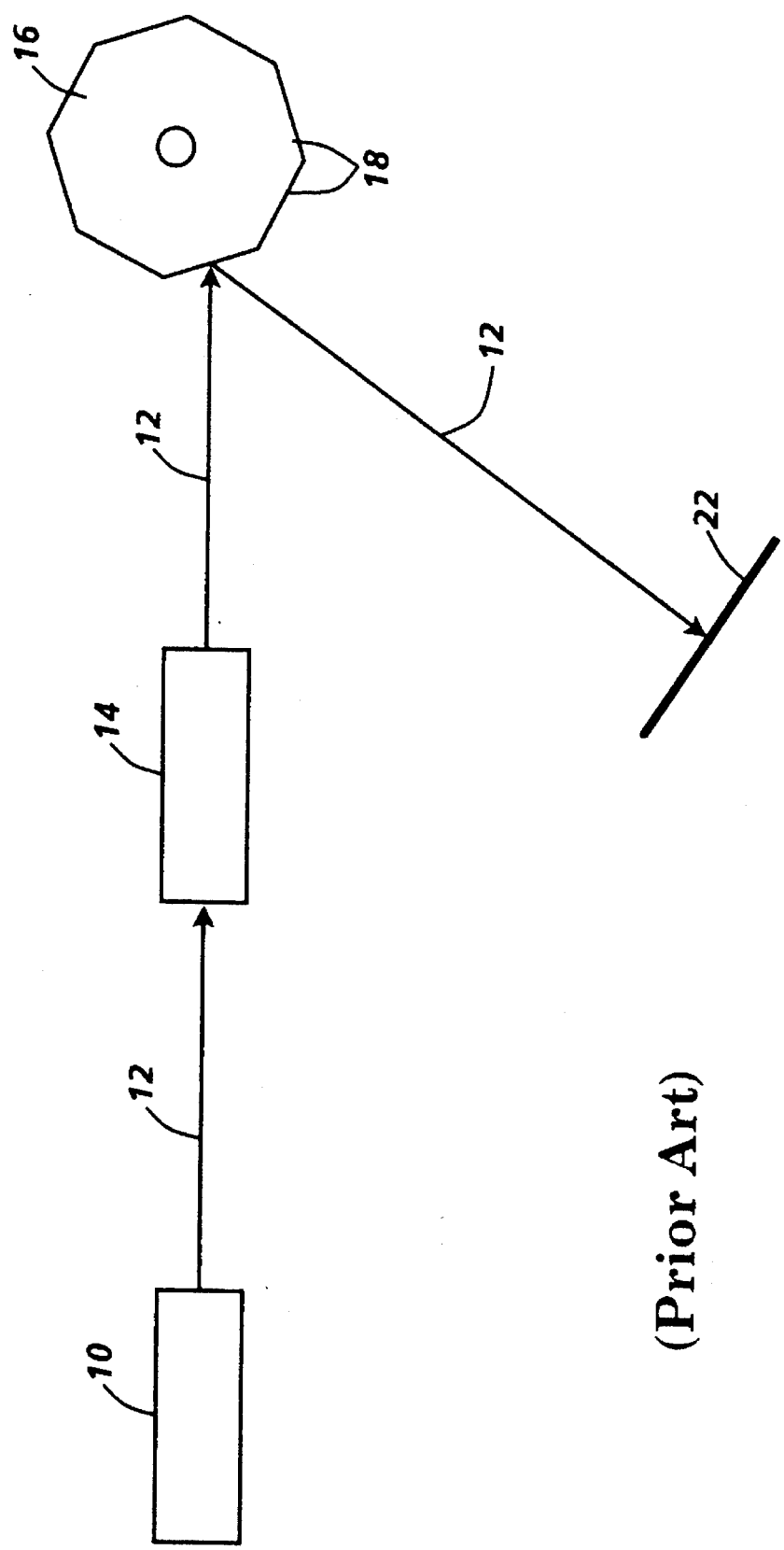
FIG. 1 shows a typical laser printing device utilizing a rotating mirror for scanning.
Figure 2:
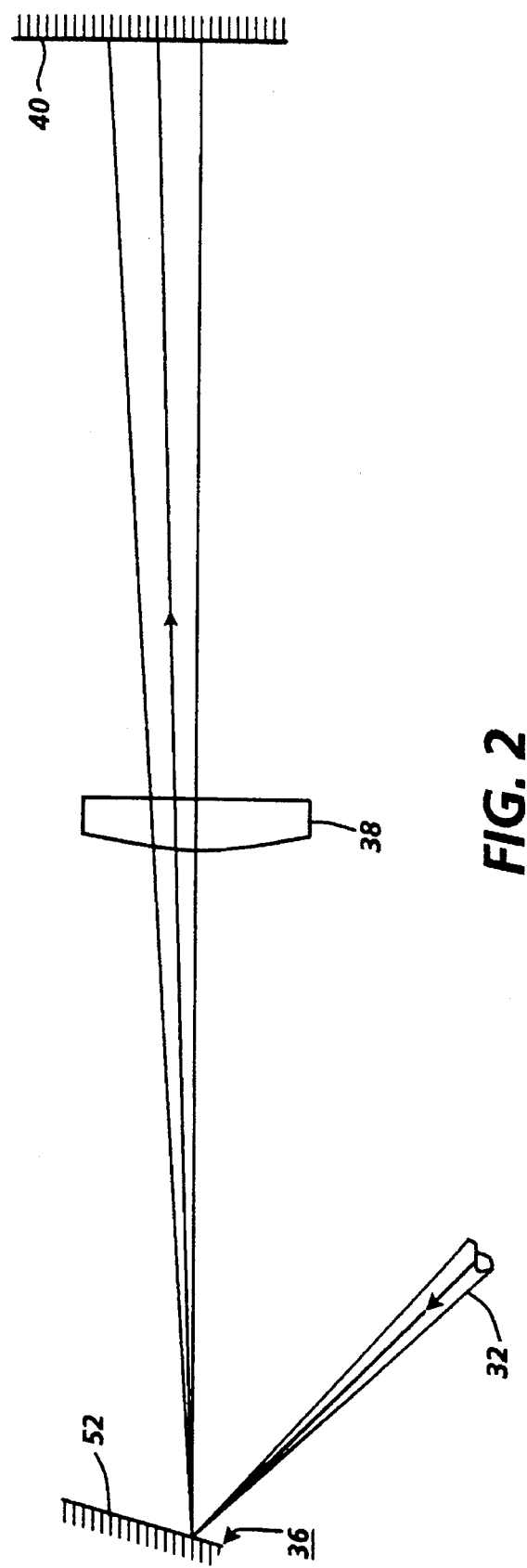
FIG. 2 shows a partial tangential plane layout of a passive facet tracking system according to the present invention.

Turning now to FIG. 2, a tangential plane partial layout of a passive facet tracking system is shown. A beam 32 is directed towards and focussed on a dual mirror motor polygon assembly 36. The dual mirror motor polygon assembly 36 is shown in a perspective view in FIG. 4. The dual mirror motor polygon assembly 36 reflects the beam 32 through passive facet tracking optics 38 to a plane mirror 40 (FIG. 2).

Figure 3:
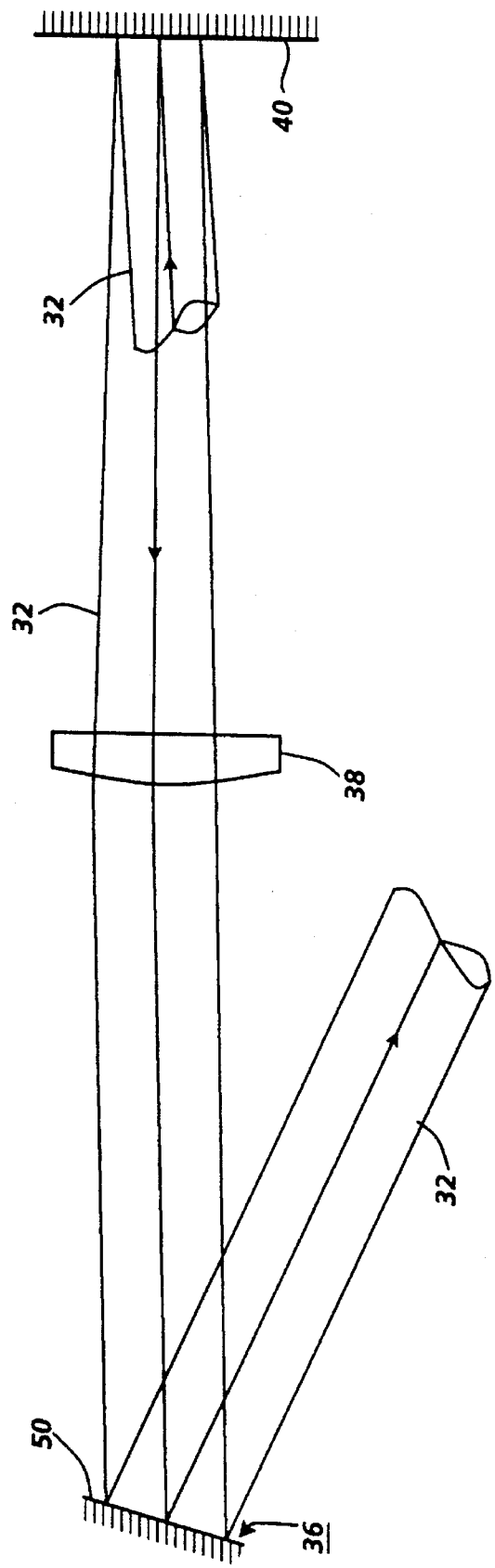
FIG. 3 shows a continuation of the tangential plane layout of the passive facet tracking system shown in FIG. 2.

As shown in FIG. 3, the plane mirror 40 reflects the beam 32 back through the passive facet tracking optics 38 to the dual mirror motor polygon assembly 36. The dual mirror motor polygon assembly 36 then reflects the beam 32 out towards post scanning optics and a photoreceptor (not shown).

Figure 4:
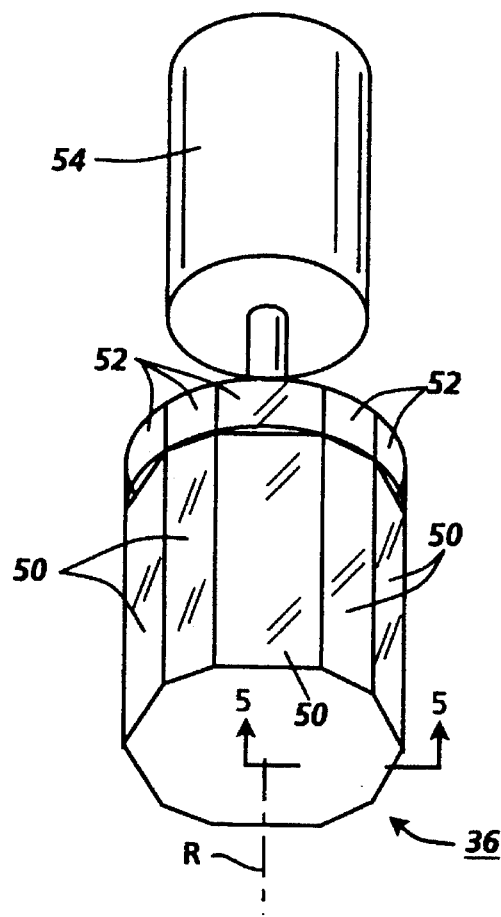
FIG. 4 shows a dual mirror motor polygon assembly in a perspective view.
Figure 5:
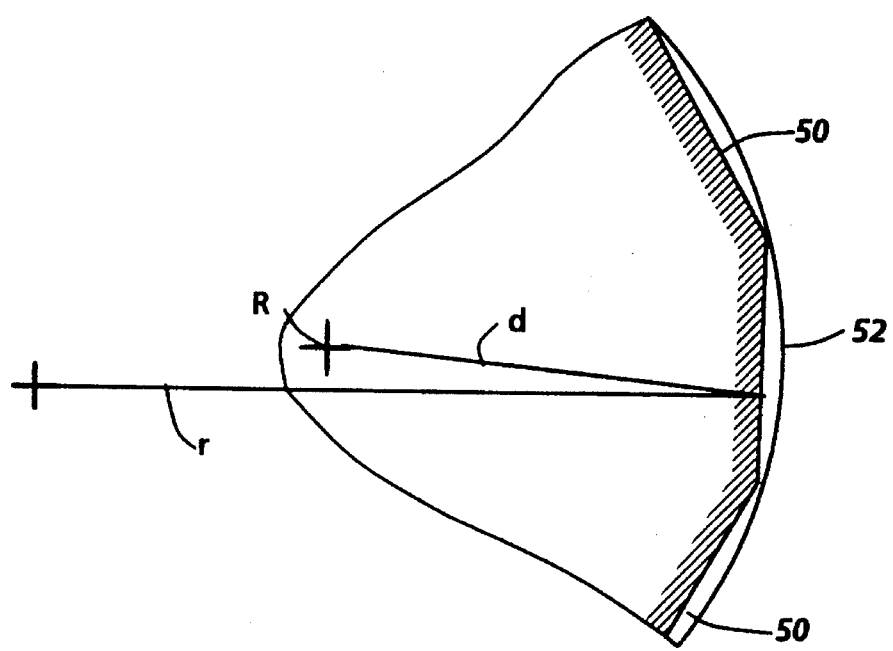
FIG. 5 shows a partial cross-sectional view of the dual mirror motor polygon assembly shown in FIG. 4.

The dual mirror motor polygon assembly 36 is shown in a perspective view in FIG. 4 and includes flat facets 50, convex facets 52 and is rotated along axis R by its motor 54. Axis R is the center of the polygon 36 and is located a distance d from the center of each flat facet 50. The convex facets 52 are curved facets, each convex facet 52 with a radius r just slightly larger than distance d of the polygon 36 as is shown in FIG. 5.

The passive facet tracking optics 38 are designed to provide different functions in the sagittal and tangential planes. These differential functions are illustrated in FIGS. 2, 3, 6 and 7. In the tangential plane, the laser beam is focussed upon the convex facet 52 (FIG. 2). Upon reflection, the laser beam transits through the facet tracking optics 38, is reflected by mirror 40 and retraces its path making a second transit of the facet tracking optics 38 and finally impacts the flat facet 50 (FIG. 3). Over this total round trip, the beam 32 becomes collimated by the facet tracking optics 38 (FIG. 3). This collimated beam tracks the flat facet 50, as it rotates to provide a scan of one line.

Figure 6:
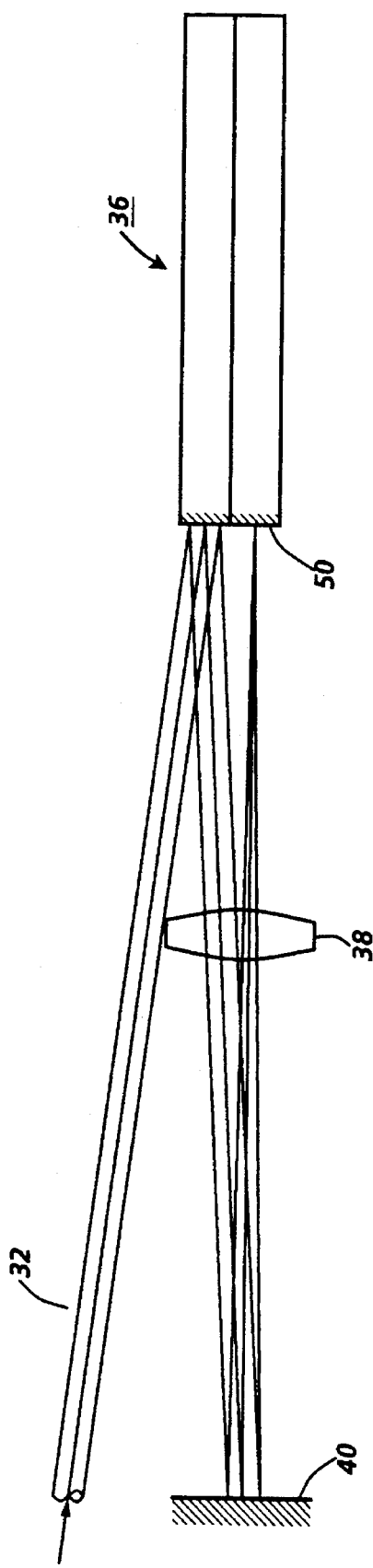
FIG. 6 shows a sagittal plane layout of the passive facet tracking system shown in FIG. 2.
Figure 7:
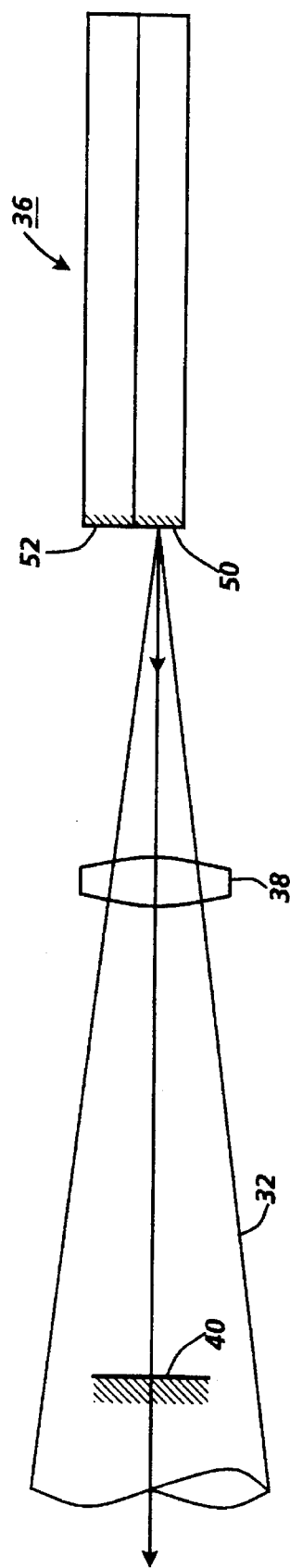
FIG. 7 shows a partial sagittal plane layout of the passive facet tracking system shown in FIG. 2.

In the sagittal plane, the laser beam 32 is not focussed but is collimated, as shown in FIG. 6, as it arrives at the convex facet 52. Over the round trip from the convex facet 52 and including the facet tracking optics 38 and mirror 40, the laser beam 32 becomes focussed when it arrives at flat facet 50. Mirror 40 is tilted slightly in the sagittal plane to allow the laser beam 32 to deflect to the flat facet 50 upon its return to the motor polygon assembly 36.

Figure 8:
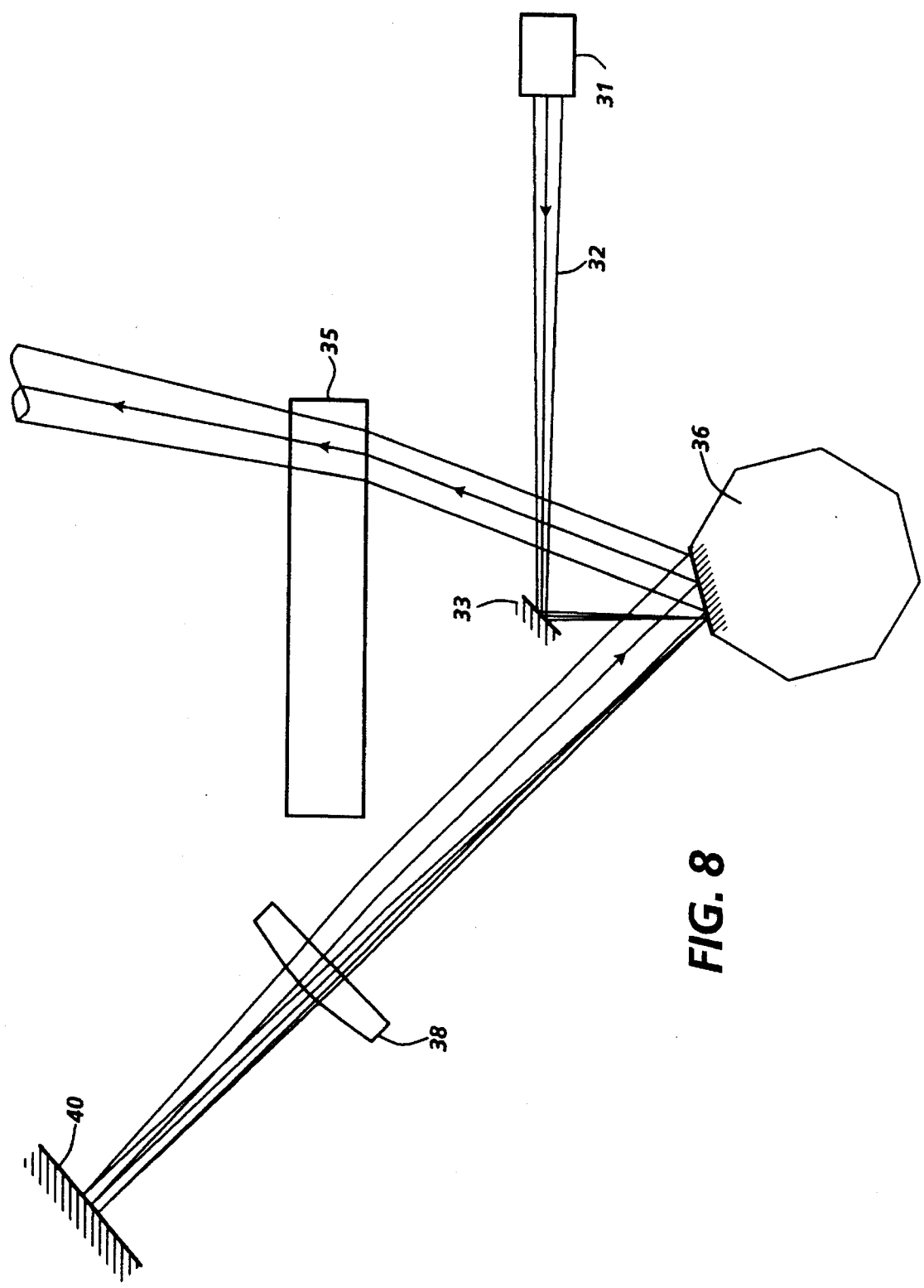
FIG. 8 shows the passive facet tracking system shown in FIG. 2 used in a laser scanning system.

FIG. 8 shows the passive facet tracking system used in a laser scanning system including a light source 31 and fold mirror 33 to direct the beam 32 to the dual mirror motor polygon assembly 36. It is from the flat facets 50 of the dual mirror motor polygon assembly 36 that the beam 32 is reflected to post scanning optics 35. With the beam 32 focussed onto the flat facet 50 in the sagittal plane, it is possible to include standard wobble correction optics in the post scanning optics which allows for a relaxation of pyramidal polygon and bearing wobble manufacturing tolerances. Additionally the beam 32 returns to the dual mirror motor polygon assembly 36 at an angle that is normal to the flat facets 50 in the sagittal plane. As the beam 32 is scanned by the dual mirror motor polygon assembly 36, it remains in this normal plane, essentially preventing scan line bow.

In the tangential plane, the laser beam 32 is collimated at the flat facet 50. The collimation of the laser beam in the tangential plane allows a relaxation of polygon radius variations between individual facets.

In the preferred optical design of the facet tracking optics 38 and mirror 40, the facet tracking optics 38 is a single plano spherical element and the mirror 40 is a plane mirror. Also in the preferred design, the facet tracking optics 38 include a single curved surface which is spherical and is located optically midway between the facets 50, 52 and the mirror 40, resulting in a completely symmetric design. In either plane, if a beam is in focus at either one of the facets, either curved or flat, it will be collimated at the other. Thus the focussed beam in the tangential plane at the convex facet 52 will return as a collimated beam at the flat facet 50. Similarly, in the sagittal plane a collimated beam at the convex facet 52 will return as a focussed beam at the flat facet 50. These are the desired beam conditions in the tangential and sagittal planes respectively.

I claim:

1. A passive facet tracking system comprising:

A) a dual mirror rotating polygon having an axis of rotation and two facets, one facet located above the other in a direction which is along the axis of rotation, one of said facets being a flat facet and the other of said facets being a convex facet, B) a retro-reflector which has no power in a sagittal plane, C) a lens means, D) said polygon, said lens means and said retro-reflector being so constructed and arranged relative to each other for said polygon convex facet to reflect a beam along a first path through said lens means to said retro-reflector, said retro-reflector receiving the beam reflected from said polygon convex facet and reflecting the beam through a second path through said lens means to said polygon flat facet, and said polygon flat facet reflecting the beam received from said retroreflector in a post scan direction, and E) said lens means being so constructed to partially collimate the beam, which has been focussed on said polygon convex facet, in a tangential plane after reflection from said polygon convex facet along the first path as the beam passes through said lens means and to complete collimation of the beam in the tangential plane after reflection from said retro-reflector along the second path as it passes through said lens means so that the beam is collimated in the tangential plane when it arrives at said polygon flat facet and to partially converge the beam, which has been collimated at said polygon convex facet, in a sagittal plane after reflection from said polygon convex facet along the first path as the beam passes through said lens means and to complete convergence of the beam in the sagittal plane after reflection from said retro-reflector along the second path as it passes through said lens means so that the beam is focussed in the sagittal plane when it arrives at said polygon flat facet.

2. The passive facet tracking system of claim 1 wherein said lens means is a single plano spherical element.

3. The passive facet tracking system of claim 1 wherein said lens means is comprised of a single spherically curved surface.

4. The passive facet tracking system of claim 1 wherein said retroreflector is a plane mirror.

5. A scanning system comprising:

A) a light source for providing a light beam,

B) focussing means for focussing the light beam,

C) post scan lens means,

D) a scanning medium,

E) passive facet tracking means comprising:

i) a dual mirror rotating polygon having an axis of rotation and two facets, one facet located above the other in a direction which is along the axis of rotation, one of said facets being a flat facet and the other of said facets being a convex facet, ii) a retro-reflector which has no power in a sagittal plane, iii) a passive facet tracking lens means,
iv) said polygon, said passive facet tracking lens means and said retro-reflector being so constructed and arranged relative to each other for said polygon convex facet to reflect a beam along a first path through said passive facet tracking lens means to said retro-reflector, said retroreflector receiving the beam reflected from said polygon convex facet and reflecting the beam through a second path through said passive facet tracking lens means to said polygon flat facet, and said polygon flat facet reflecting the beam received from said retro-reflector in a post scan direction, and
v) said passive facet tracking lens means being so constructed to partially collimate the beam in a tangential plane after reflection from said polygon convex facet along the first path as the beam passes through said passive facet tracking lens means and to complete collimation of the beam in the tangential plane after reflection from said retro-reflector along the second path as it passes through said passive facet tracking lens means so that the beam is collimated in the tangential plane when it arrives at said polygon flat facet and to substantially collimate the beam in the sagittal plane after reflection from said polygon convex facet along the first path as the beam passes through said passive facet tracking lens means and to focus the beam in the sagittal plane after reflection from said retro-reflector along the second path as it passes through said passive facet tracking lens means so that the beam is focussed in the sagittal plane when it arrives at said polygon flat facet.
F) said light source, focussing means, and passive facet tracking means so constructed and arranged such that the light beam from the light source will be focussed on the polygon convex facet, and
G) said passive facet tracking means, post scan lens means, and scanning medium so constructed and arranged such that the beam reflected in the post scan direction passes through said post scan lens means and is received by said scanning medium.

6. The passive facet tracking system of claim 5 wherein said lens means is a single plano spherical element.

7. The passive facet tracking system of claim 5 wherein said lens means is comprised of a single spherically curved surface.

8. The passive facet tracking system of claim 5 wherein said retroreflector is a plane mirror.

* * * * *